US008303135B2

(12) United States Patent
Cercone

(10) Patent No.: US 8,303,135 B2
(45) Date of Patent: Nov. 6, 2012

(54) VIDEO CONFERENCE LIGHTING FIXTURE

(76) Inventor: Samuel P. Cercone, Aliquippa, PA (US)

( * ) Notice: Subject to any disclaimer, the term of this patent is extended or adjusted under 35 U.S.C. 154(b) by 242 days.

(21) Appl. No.: 12/622,994

(22) Filed: Nov. 20, 2009

(65) Prior Publication Data

US 2010/0124062 A1 May 20, 2010

Related U.S. Application Data

(60) Provisional application No. 61/116,482, filed on Nov. 20, 2008.

(51) Int. Cl.
*F21V 11/02* (2006.01)
*G03B 15/02* (2006.01)

(52) U.S. Cl. ........... 362/290; 362/279; 362/18; 362/147

(58) Field of Classification Search ................ 362/3, 11, 362/16, 18, 147, 217.03, 279, 290
See application file for complete search history.

(56) References Cited

U.S. PATENT DOCUMENTS

| | | | | |
|---|---|---|---|---|
| 5,149,191 | A * | 9/1992 | Lewin et al. | 362/290 |
| 6,517,216 | B1 | 2/2003 | Cercone et al. | |
| 7,119,829 | B2 | 10/2006 | Leonard et al. | |
| 7,837,361 | B2 * | 11/2010 | Santoro et al. | 362/355 |
| 2010/0039799 | A1 * | 2/2010 | Levens | 362/147 |

* cited by examiner

*Primary Examiner* — David V Bruce
(74) *Attorney, Agent, or Firm* — The Webb Law Firm, P.C.

(57) ABSTRACT

A lighting fixture for use in video conferencing and general illumination includes a housing forming an interior cavity. The housing has an opening in a bottom portion thereof. The lighting fixture also includes at least one light holder for holding at least one light source positioned within the interior cavity of the housing, at least one diffuser plate positioned over the opening of the housing, and a plurality of louvers adjacent to the diffuser plate over the opening of the housing. Each of the plurality of louvers is positioned at an angle such that light produced by the light source is directed to a specific area.

18 Claims, 11 Drawing Sheets

VIDEO CONFERENCE LIGHTING FIXTURE

CROSS REFERENCE TO RELATED APPLICATIONS

This application claims the benefit of U.S. Provisional Patent Application No. 61/116,482 entitled "Video Conference Lighting Fixture" filed Nov. 20, 2008, which is hereby incorporated by reference in its entirety.

BACKGROUND OF THE INVENTION

1. Field of the Invention

The invention relates in general to a lighting fixture and, more particularly, to a lighting fixture for providing virtually glare-free light for illuminating a participant in a video conference or distance education environment, as well as for general lighting.

2. Description of Related Art

Video conferencing is quickly becoming a common way of communicating in business, training, and education as it allows participants in remote locations to meet and converse with one another as if they were present in the same room. Video conferencing can include one-on-one meetings, such as through a computer equipped with a video camera, or larger meetings utilizing a series of cameras, microphones, and lighting fixtures. Immersive video conference centers are being developed which comprise, for example: a semi-circular table and/or a standard conference room table having a series of chairs positioned therearound; a screen positioned in the center of the semi-circular table; and a video view of a semi-circular table and chairs at a remote location. The participants in the video conference meeting feel as if they are conducting a regular meeting with all of the participants located around a table in a single location. When designing these centers, care must be taken to ensure that the participants are properly lighted so that their faces are not cast in shadows or washed out from too much direct light. The correct lighting makes a tremendous difference in how people look, and thus how they communicate, during a video conference or distance education session.

U.S. Pat. No. 7,119,829 to Leonard et al. teaches a virtual conference room wherein lighting is selected and the furnishings are arranged and located within the room in a manner to optimize the quality of the image captured by a camera. The reference discusses a comprehensive lighting plan that includes a series of overhead lighting fixtures arrayed on the ceiling of the room, a series of side panels arrayed along the side walls of the room, and lighting under the conference table. The lighting fixtures include a curved or scalloped surface that is shaped to reflect light downward and backward to provide strong diffuse lighting of the participants. The side panels are arrayed along the right and left side walls to provide diffuse side and back lighting. Rope lighting is provided underneath the conference table to make the boundary of the table more discrete and to subtly light the lower body parts of the participants.

The video conference center discussed above, however, has several disadvantages, the main disadvantage being that it is expensive to build and requires the use of a complicated series of lights strategically placed throughout the room. Accordingly, there is a need in the art for a lighting alternative to the systems currently in use.

SUMMARY OF THE INVENTION

It is therefore an object of the present invention to provide a lighting fixture capable of diffusing the amount of light shone upon a participant in a video conference meeting or a distance education session so as to eliminate shadows on the face, reduce the contrast ratio, and allow up-close video transmitting. It is a further object of the present invention to provide a lighting solution capable of adequately lighting a number of participants in a video conferencing or distance education environment. It is also an objective of the present invention to provide a lighting fixture that provides a range of glare reduction, up to virtually glare-free light, for illuminating a participant in a video conference or distance education environment, as well as for general lighting.

The present invention is directed to a lighting fixture for use in video conferencing and general illumination. The lighting fixture includes a housing forming an interior cavity. The housing has an opening in a bottom portion thereof. The lighting fixture also includes at least one light holder for holding at least one light source positioned within the interior cavity of the housing, at least one diffuser plate positioned over the opening of the housing, and a plurality of louvers adjacent to the diffuser plate over the opening of the housing. Each of the plurality of louvers is positioned at an angle such that light produced by the light source is directed to a specific area.

Each of the plurality of louvers may be positioned at the same angle. For instance, each of the plurality of louvers may be positioned at an angle of between about 40° to about 50°, such as about 45°. Alternatively, each of the plurality of louvers may be positioned at an angle of about 90°. In another embodiment, half of the plurality of louvers may be positioned at a first angle and the remaining louvers are positioned at a second angle. At least one louver spring may be provided to hold the plurality of louvers in the proper position over the opening of the housing.

A ballast may be connected to the at least one light holder to drive the at least one light source. The ballast may be one of a standard 40 to 55 watt ballast, a remotely adjustable and controllable digital ballast, a phase dim ballast, an adjustable analog ballast, and a switch-type non-dimming ballast. The diffuser plate may be manufactured from a frosted acrylic material.

The present invention is also a method of providing lighting to a space. The method begins with the step of providing a lighting fixture. The lighting fixture includes a housing forming an interior cavity and having an opening in a bottom portion thereof; at least one light holder for holding at least one light source positioned within the interior cavity of the housing; at least one diffuser plate positioned over the opening of the housing; and a plurality of louvers adjacent to the diffuser plate over the opening of the housing. The method also includes the step of positioning each of the plurality of louvers at an angle such that light produced by the light source is directed to a specific area.

Each of the plurality of louvers may be positioned such that a beam spread provided by the lighting fixture extends substantially between 50% output points when viewed in a vertical direction. In addition, each of the plurality of louvers may be positioned at the same angle. Each of the plurality of louvers may be positioned at an angle of between about 40° to about 50°, and desirably at an angle of about 45°. Alternatively, each of the plurality of louvers may be positioned at an angle of about 90°. In still another embodiment, half of the plurality of louvers may be positioned at a first angle and the remaining louvers may be positioned at a second angle.

The present invention is also a lighting fixture for use in video conferencing and general illumination. The lighting fixture includes: a housing forming an interior cavity and an opening in a bottom portion thereof; at least one light source positioned within the interior cavity of the housing; and a plurality of louvers positioned over the opening of the housing. Each of the plurality of louvers is positioned such that a beam spread provided by the lighting fixture extends substantially between 50% output points when viewed in a vertical direction. Each of the plurality of louvers may be positioned at the same angle, such as an angle of between about 40° to about 50°.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. As used in the specification and the claims, the singular form of "a", "an", and "the" include plural referents unless the context clearly dictates otherwise.

DETAILED DESCRIPTION OF THE INVENTION

Figure 1:
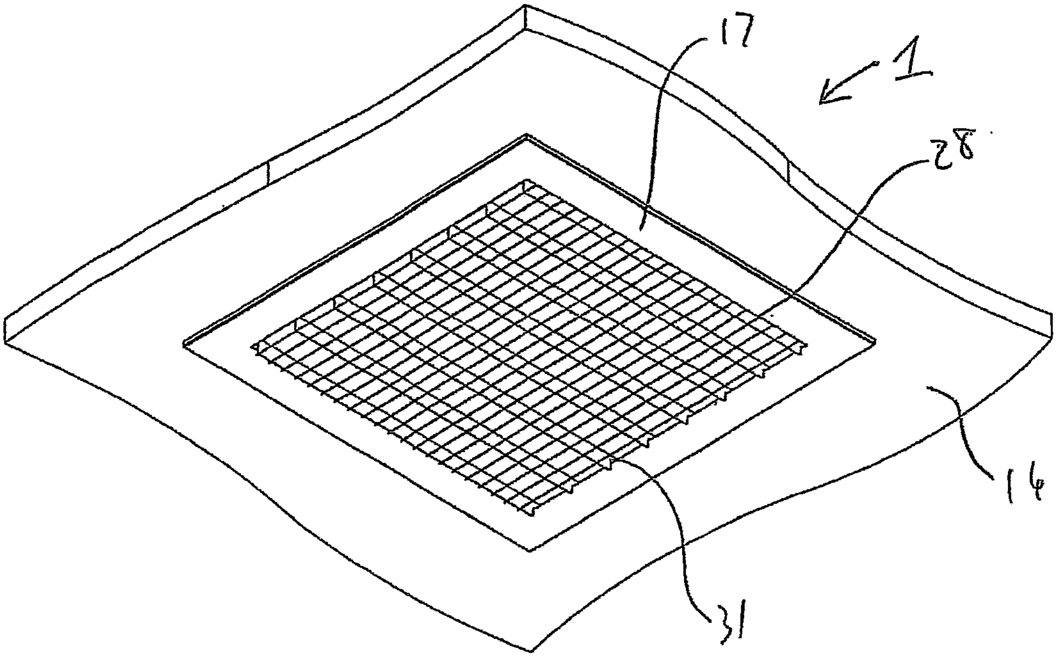
FIG. 1 is a bottom perspective view of a lighting fixture in accordance with the present invention installed in a ceiling.
Figure 2:
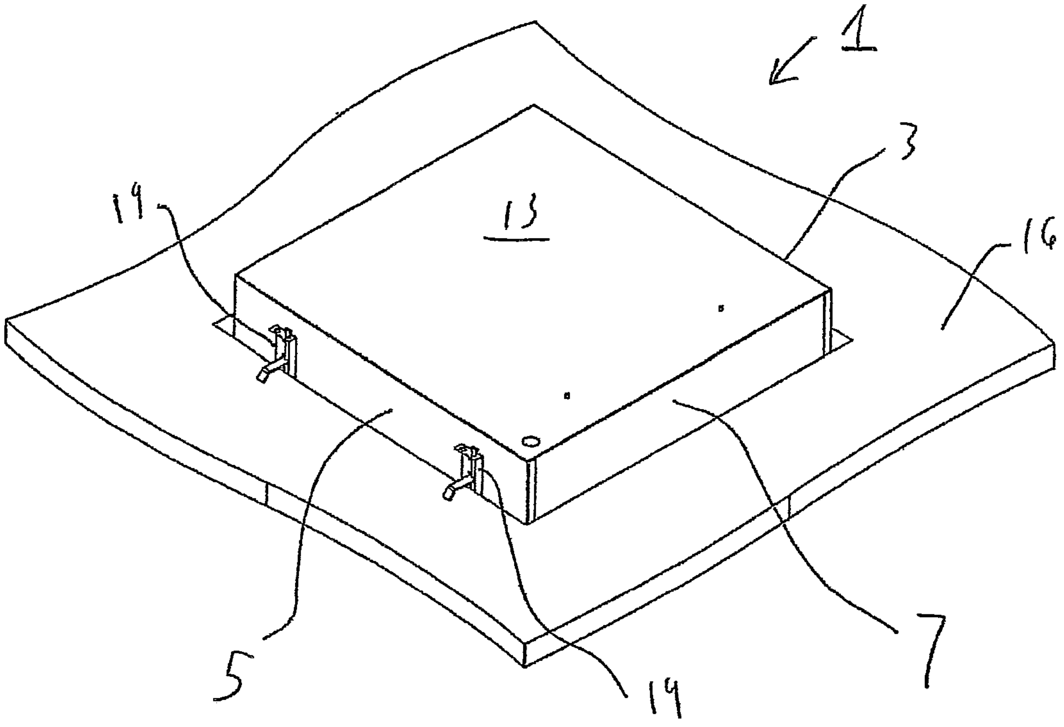
FIG. 2 is a top perspective view of the lighting fixture of FIG. 1 installed in a ceiling.
Figure 3:
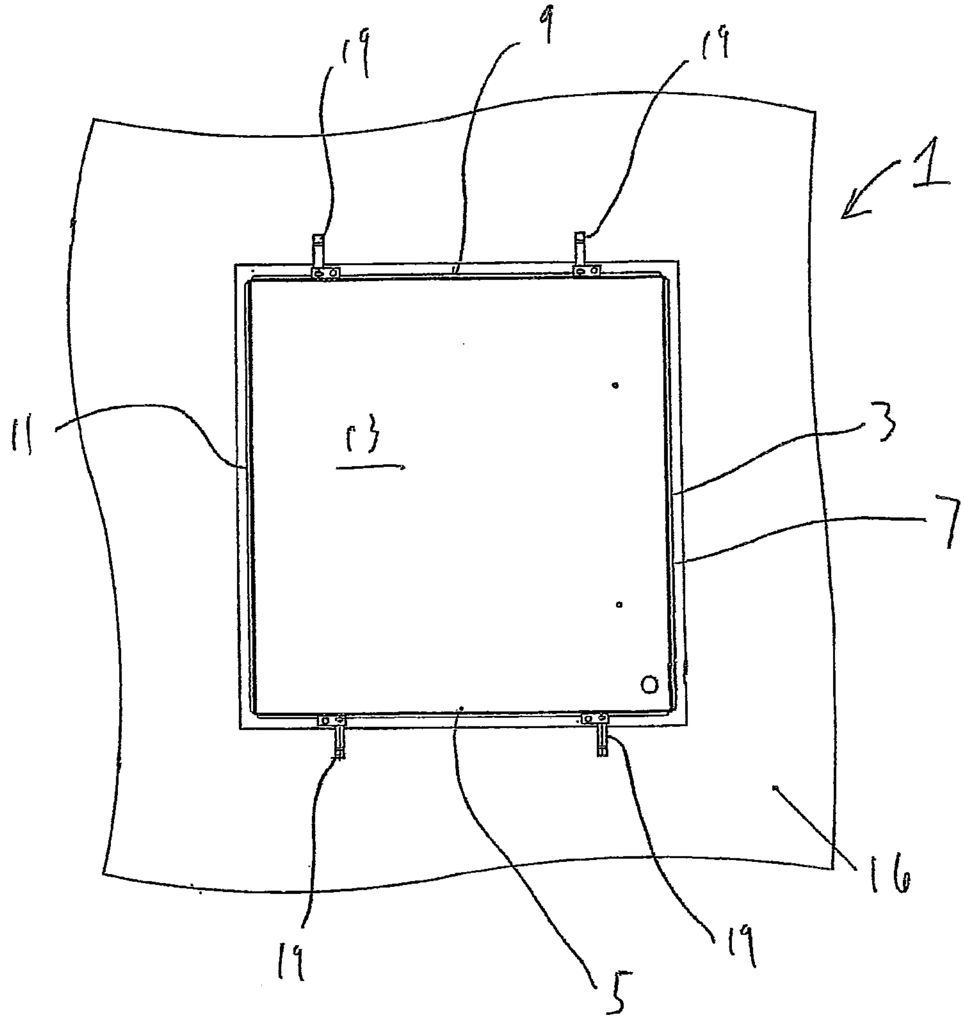
FIG. 3 is a top plan view of the lighting fixture of FIG. 1.
Figure 4:
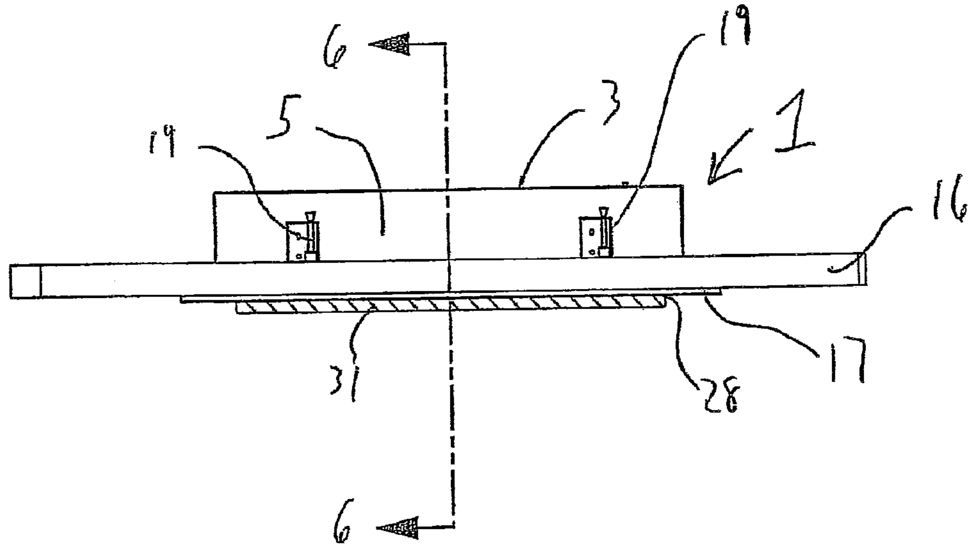
FIG. 4 is a front plan view of the lighting fixture of FIG. 1.
Figure 5:
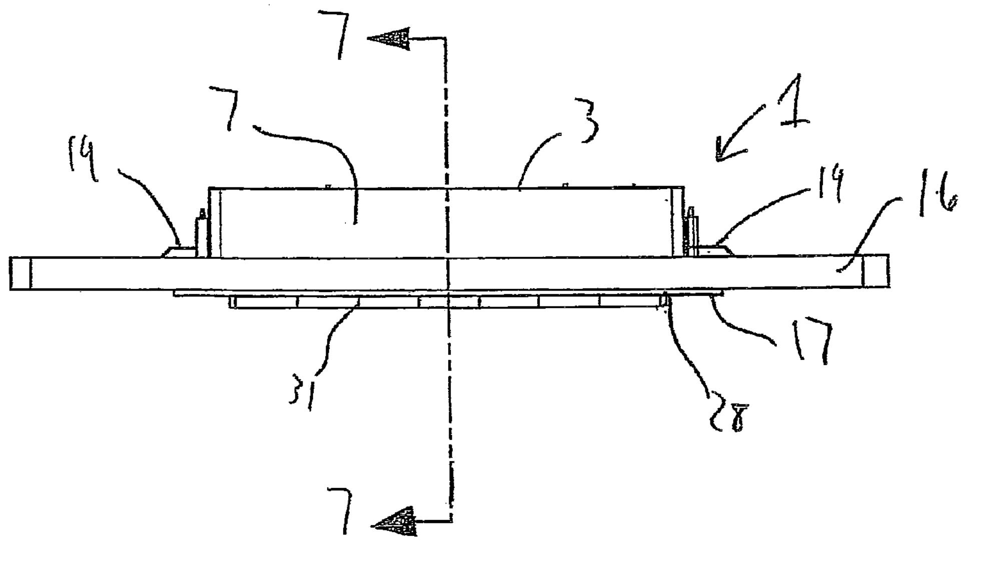
FIG. 5 is a side plan view of the lighting fixture of FIG. 1.

For purposes of the description hereinafter, the spatial orientation terms and derivatives thereof shall relate to the embodiment as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments. Hence, specific dimensions and other physical characteristics related to the embodiments disclosed herein are not to be considered as limiting.

With reference to FIGS. 1-9, a lighting fixture for use in video conferencing, denoted generally as reference numeral 1, includes a housing 3 in the shape of a hollow box having a first wall 5, a second wall 7, a third wall 9, a fourth wall 11, and a fifth wall 13 with the walls 5, 7, 9, 11, 13 forming an interior cavity 15. Housing 3 has a generally rectangular or square shape and is configured to be positioned within an opening in a ceiling 16. A peripheral flange 17 extends from the bottom of walls 5, 7, 9, and 11 and is configured to be positioned flush with ceiling 16. A pair of swing arm assemblies 19 is positioned on each of walls 5 and 9 and is configured to securely mount lighting fixture 1 to ceiling 16. Housing 3 may be constructed from cold-rolled steel; however, this is not to be construed as limiting the present invention as any suitable material may be used to construct housing 3.

Figure 6:
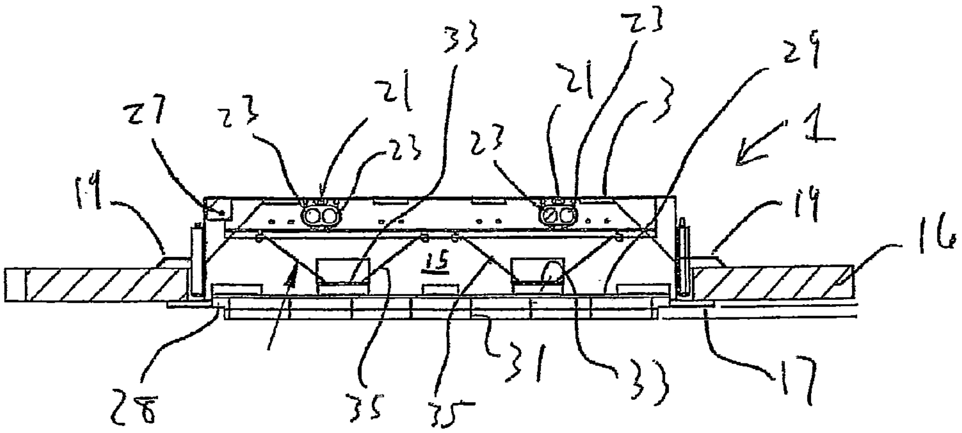
FIG. 6 is a cross-sectional view of the lighting fixture of FIG. 1 taken along line 6-6 in FIG. 4.
Figure 7:
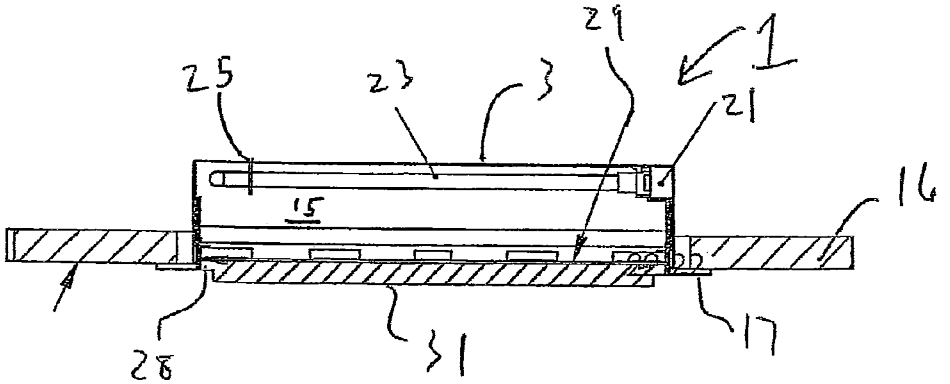
FIG. 7 is a cross-sectional view of the lighting fixture of FIG. 1 taken along line 7-7 in FIG. 5.
Figure 8:
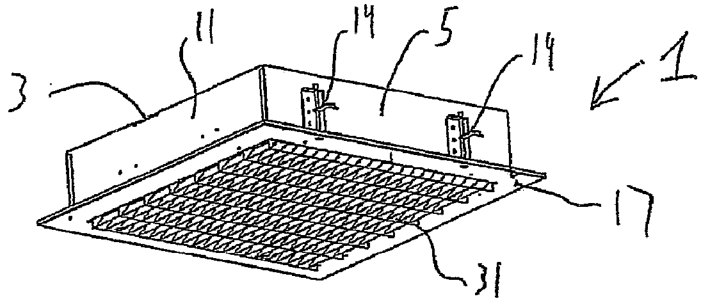
FIG. 8 is a perspective view of a lighting fixture having a plurality of louvers positioned according to a first embodiment of the present invention.
Figure 9:
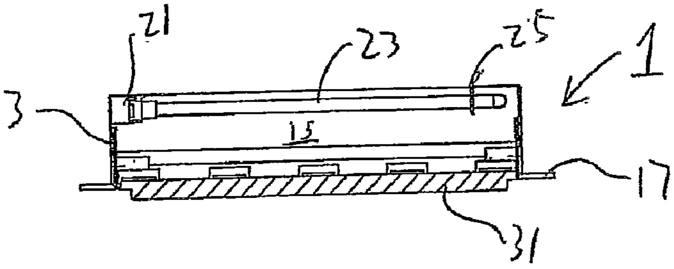
FIG. 9 is a cross-sectional view of the lighting fixture of FIG. 8.

With specific reference to FIGS. 6 and 7, lighting fixture 1 also includes a pair of light holders 21 for holding a pair of light sources 23 positioned within interior cavity 15 of housing 3. However, this is not to be construed as limiting the present invention as each light holder 21 may hold from one to four light sources 23 and lighting fixture 1 may include more or less than a pair of light holders 21. Light sources 23 may be fluorescent bulbs. Examples include, but are not limited to, 55 watt "biax" fluorescent bulbs or broadcast quality fluorescent bulbs having a color rendering index (CRI) of approximately 80 or higher, with a CRI of 85-95 being preferred for fluorescent or enhanced fluorescent broadcast lighting, such as for video and teleconferencing applications. Light source support clips 25 may be coupled to fifth wall 13 to provide further support for light sources 23.

In addition, electronic ballasts 27 are positioned within interior cavity 15 of housing 3. Ballasts 27 drive light sources 23. Ballasts 27 may be standard 40-55 watt ballasts, a remotely adjustable and controllable digital ballast formed from printed circuit boards, a phase dim ballast, an adjustable analog ballast, or a switch-type non-dimming ballast. The adjustable ballasts may be adjustable to an overall luminosity, such as between 5-100 percent, digitally by a DMX-512 system or a DALI system, by analog controls, such as 0-10 Volt potentiometers or by digital controls, or one of the many other lighting control systems known to those in the art. For the DMX-512 controlled systems, each ballast 27 may be in communication via a DMX-512 interface with a control console or other device generating DMX-512 signals.

Housing 3 also includes an opening 28 in a bottom portion thereof. A diffuser plate 29 is positioned over opening 28 of housing 3. Diffuser plate 29 may be made of a frosted acrylic material or any other suitable material. Depending on the material chosen for diffuser plate 29, lighting fixture 1 is configured to provide light with a range of glare reduction up to and including virtually glare-free light. A plurality of louvers 31 is positioned adjacent to diffuser plate 29 over opening 28 of housing 3. Louvers 31 are mounted onto diffuser plate 29 which is in turn mounted to a door frame 33, thereby forming a louver assembly. Four louver springs 35 may be provided to hold louvers 31 in the proper position over opening 28 of housing 3. Louver springs 35 create a force that pulls louvers 31 up against housing 3. In addition, louver springs 35 allow for the louver assembly to be removed from housing 3 without the use of tools. Louvers 31 and door frame 33 may be painted with matte white enamel finish. Housing 3 may be painted with a high-gloss electrostatically applied white enamel finish. However, this is not to be construed as limiting the present invention as any suitable finish may be used on housing 3, louvers 31, and door frame 33.

Each of the plurality of louvers 31 is positioned at an angle such that light produced by light sources 23 is directed to a specific area. More specifically, louvers 31 are configured to direct light produced by lighting fixture 1 onto a person engaging in a teleconference and off of the screen being used by the person during the video conference. By positioning louvers 31 at an angle, light produced by light sources 23 can be directed in the manner described above without the need to move or adjust light sources 23.

Figure 10:
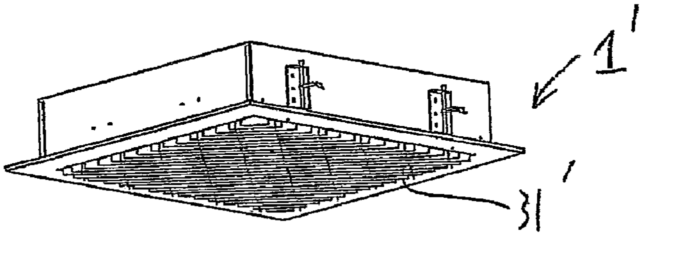
FIG. 10 is a perspective view of a lighting fixture having a plurality of louvers positioned according to a second embodiment of the present invention.
Figure 11:
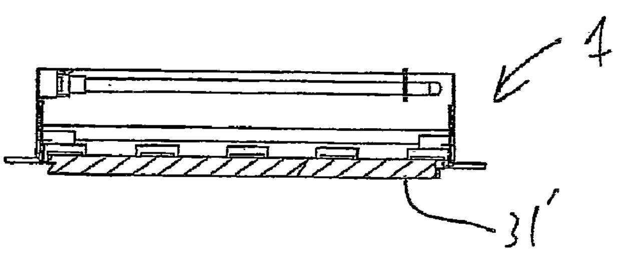
FIG. 11 is a cross-sectional view of the lighting fixture of FIG. 10.
Figure 17A:
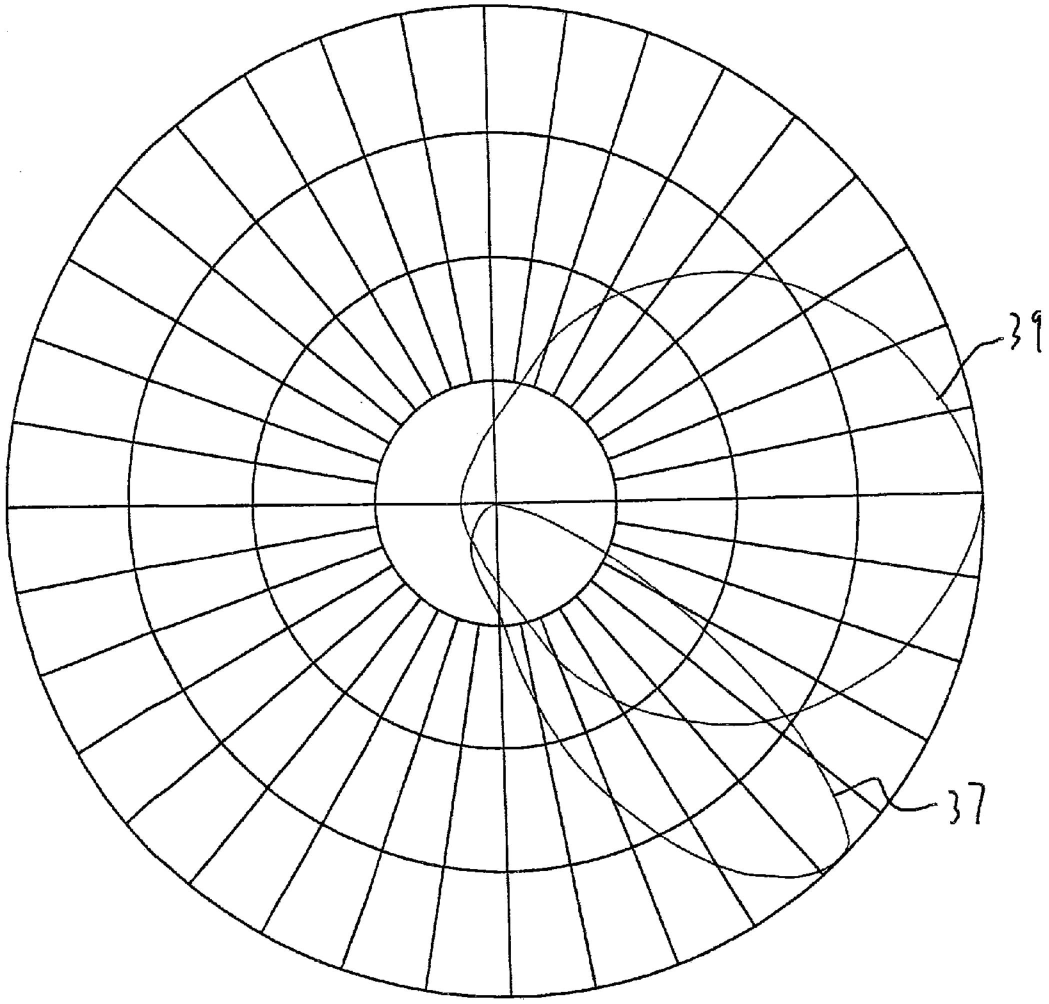
FIGS. 17A-17C are graphs illustrating the polar light distribution of the lighting fixture of FIG. 1 using diagonal louvers.

In the embodiment illustrated in FIGS. 1-9, each of the plurality of louvers 31 may be positioned at an angle of between about 40° to about 50°, such as about 45°. The polar light distribution provided by such a configuration controls light output by fixture 1 by keeping the produced light focused on a participant in a video conference and preventing the produced light from being focused on the screen of the display used in the video conference. FIG. 17A provides a graph illustrating a polar light distribution for the light produced by lighting fixture 1. Curve 37 represents the distribution of light in the vertical direction, while curve 39 is the distribution of light in the horizontal direction. Each of these curves represents the fixture's "curve" at the direction of maximum light output. With reference to FIGS. 10 and 11, a similar polar light distribution is achieved by providing a lighting fixture 1' having louvers 31' positioned at an angle of about 45° and diagonal across opening 28, rather than parallel to the opening as with the embodiment of FIGS. 1-9.

Figure 12:
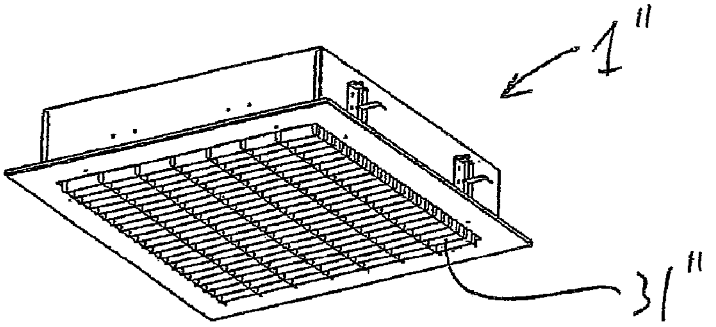
FIG. 12 is a perspective view of a lighting fixture having a plurality of louvers positioned according to a third embodiment of the present invention.
Figure 13:
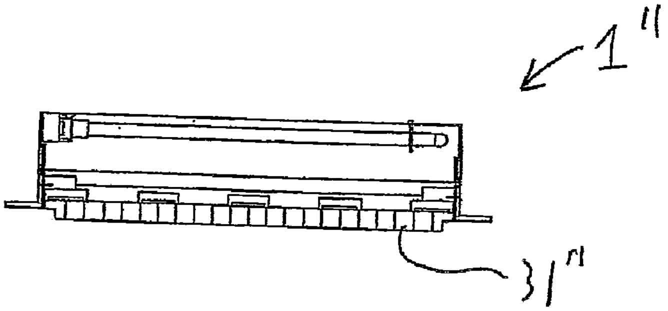
FIG. 13 is a cross-sectional view of the lighting fixture of FIG. 12.
Figure 14:
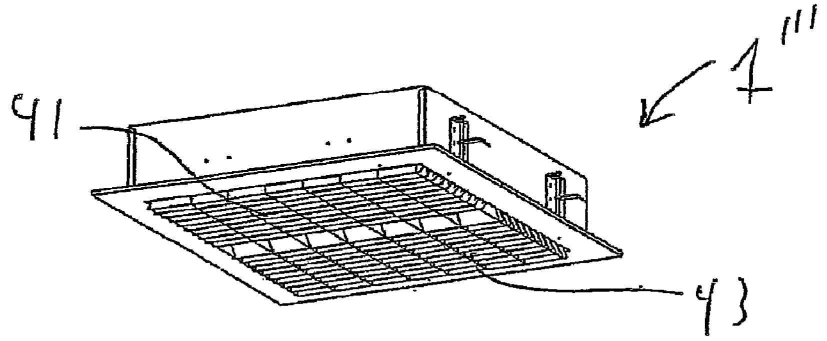
FIG. 14 is a perspective view of a lighting fixture having a plurality of louvers positioned according to a fourth embodiment of the present invention.
Figure 15:
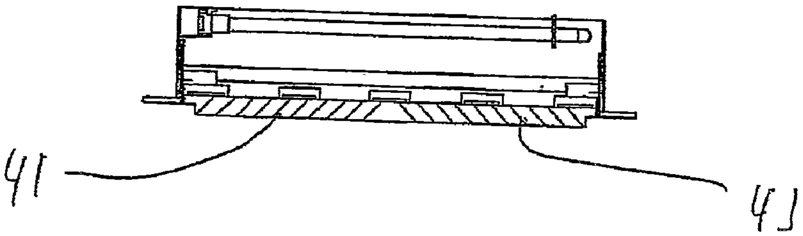
FIG. 15 is a cross-sectional view of the lighting fixture of FIG. 14.

With reference to FIGS. 12 and 13, an alternative embodiment of a lighting fixture 1" includes a plurality of louvers 31" positioned at an angle of about 90°. The purpose of such a configuration is to direct light produced by lighting fixture 1" directly down. Finally, with reference to FIGS. 14 and 15, still another embodiment of a lighting fixture 1''' has half of the plurality of louvers 41 positioned at a first angle and the remaining louvers 43 positioned at a second angle. This type of lighting fixture 1''' may be utilized in a classroom setting for distance education so that light can be provided to the instructor and the first row of students.

Figure 16:
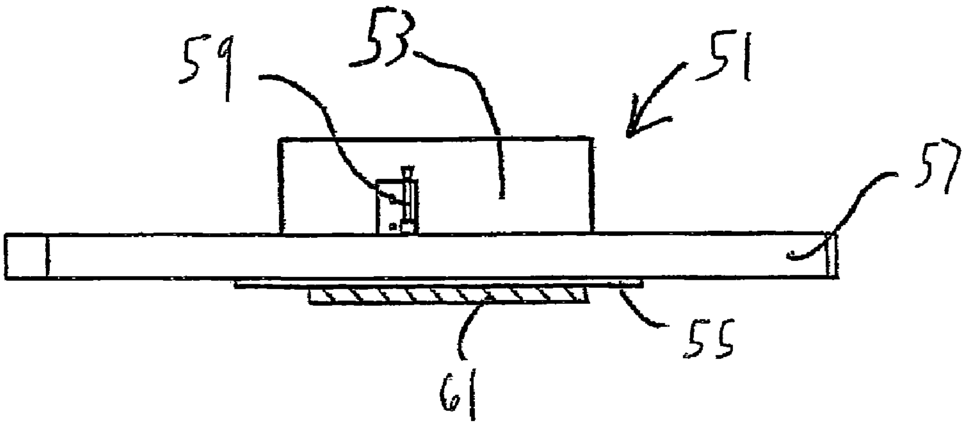
FIG. 16 is a front plan view of the lighting fixture in accordance with a fifth embodiment of the present invention.

In addition, lighting fixtures 1, 1', 1", and 1''' may be provided as "half-size" lighting fixtures as shown in FIG. 16. Such a "half-size" light fixture 51 includes a housing 53 that is half the size of the housing 3 of the lighting fixtures discussed hereinabove. A peripheral flange 55 extends from the bottom of the housing 53 and is configured to be positioned flush with the ceiling 57. A swing arm assembly 59 is positioned on each side wall of housing 53 and is configured to securely mount "half-size" lighting fixture 53 to ceiling 57. The "half-size" lighting fixture 51 also includes a plurality of louvers 61 similar to lighting fixtures 1, 1', 1", and 1'''. These "half-size" lighting fixtures are useful for installation near walls and other limited clearance spaces.

The lighting fixtures of the present invention provide light with varying degrees of diffusion up to and including virtually glare-free light. Such lighting provides a comfortable work environment. In addition, the lighting fixtures of the present invention diffuse the amount of light shone upon a participant in a video conference meeting or a distance education session so as to eliminate shadows on the face, reduce the contrast ratio, and allow up-close video transmitting.

EXAMPLES

The invention will now be described by the following example. This example is intended to be illustrative only and is not intended to limit the scope of the invention. The examples were conducted by mounting a lighting fixture with diagonal louvers such as lighting fixtures 1 and 1' in a dark room with a plurality of light sensors. The results of these examples are provided in the polar light distribution graphs of FIGS. 17A-17C. Each of these curves represents the fixture's "curve" at the direction of maximum light output.

Figure 17B:
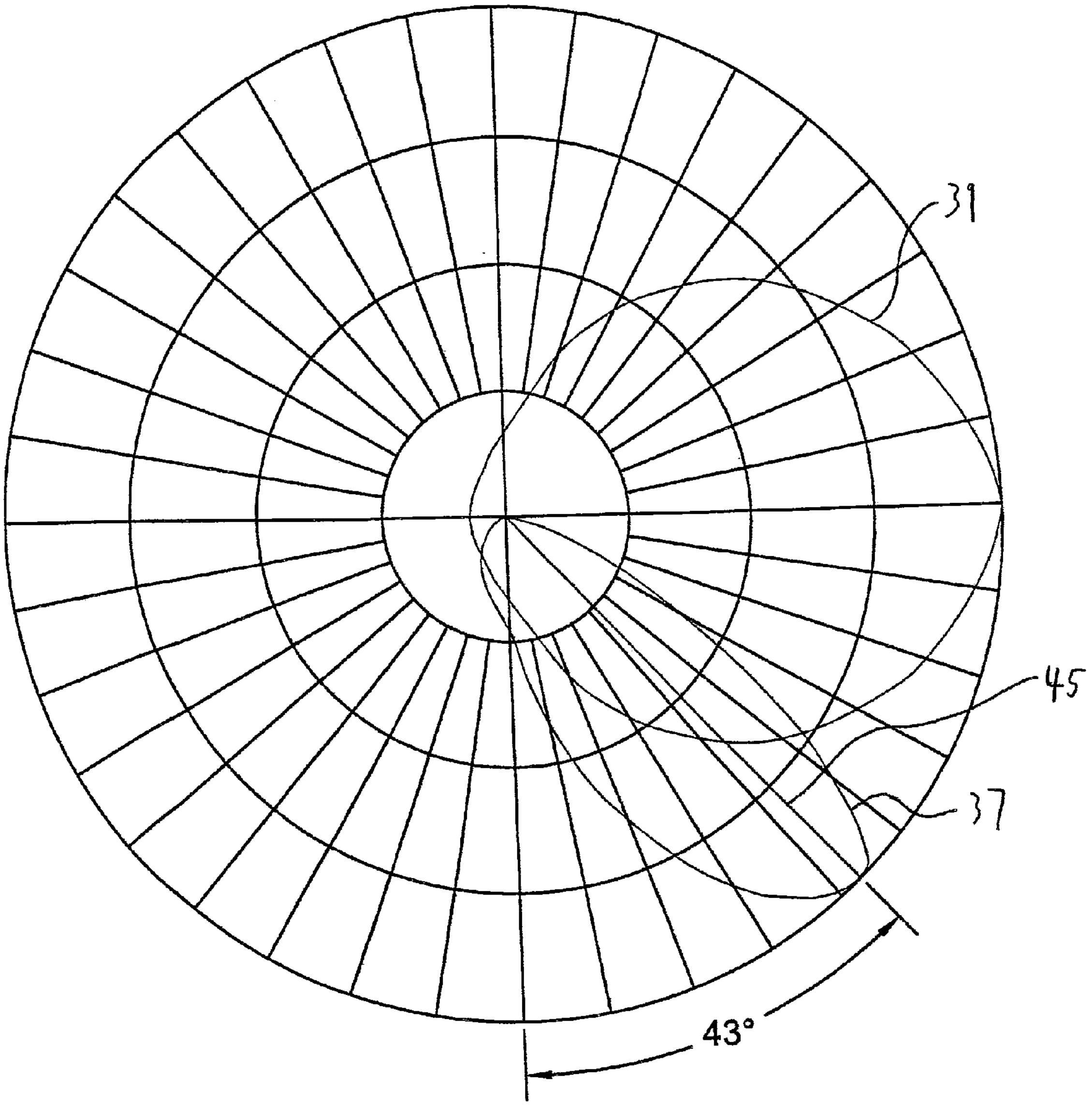
Figure 17C:
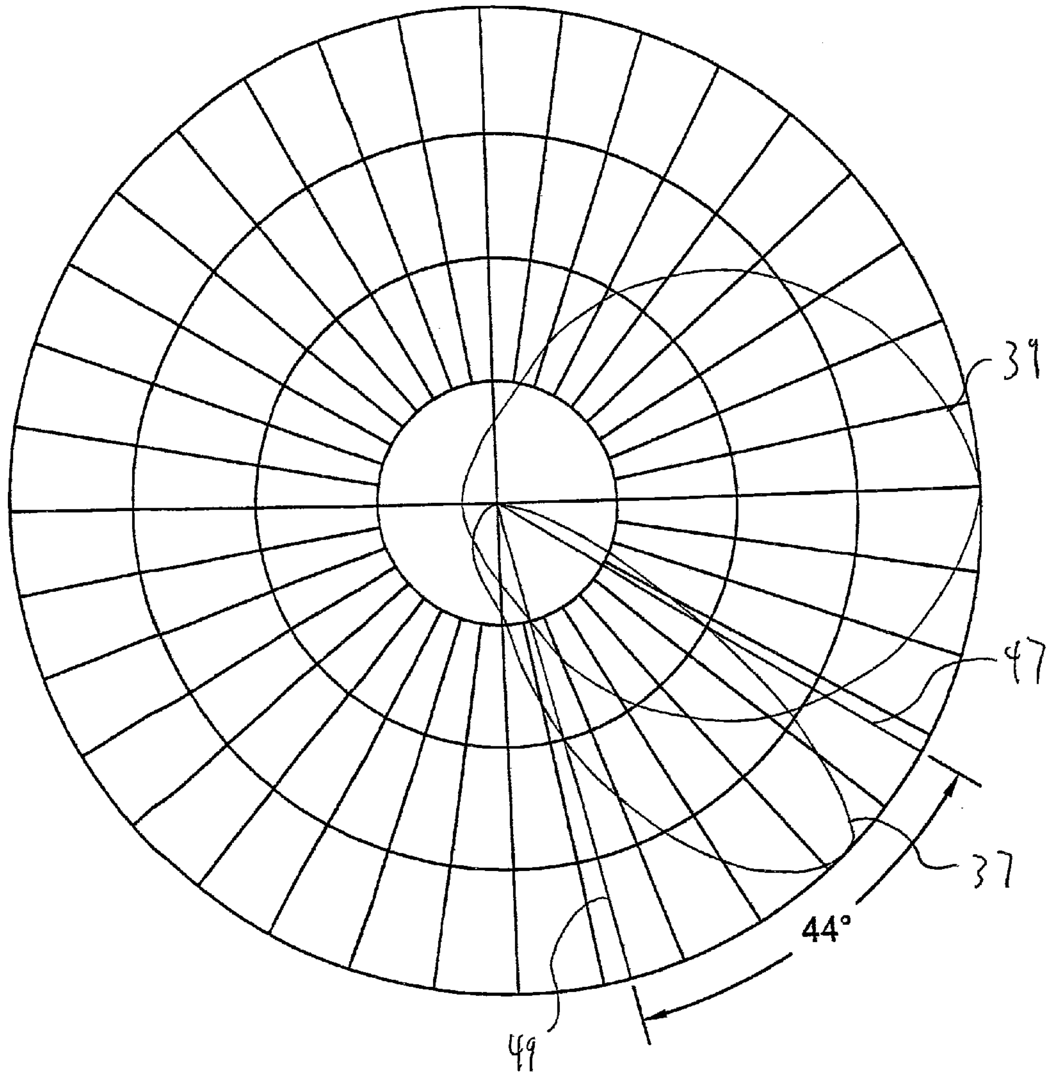

More specifically, the polar light distribution graph of FIG. 17A represents the horizontal and vertical output of lighting fixture 1 or 1'. Curve 39 is the beam spread in the horizontal direction (i.e., as if one was above the lighting fixture and looking down on it). Curve 37 is the beam spread in the vertical direction (i.e., as if one was beside the lighting fixture and looking at it from the side). The polar light distribution graph of FIG. 17B represents the beam angle of the lighting fixture measured from an angle looking straight down on the lighting fixture to the maximum output point. The beam angle is represented by line 45. This beam angle allows for the elimination of shadows on the face of participants in a video conference. The polar light distribution graph of FIG. 17C represents the beam spread of the fixture. Lines 47 and 49 are at the 50% output points. As can be seen by this graph, substantially all of the beam spread (looking at the lighting fixture from the side) is between the 50% output points. This allows the light produced by the lighting fixture to be concentrated on a person using a video conferencing system, for instance, rather than on the walls and other areas of a room.

Although the invention has been described in detail by illustrative embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

The invention claimed is:

1. A lighting fixture for use in video conferencing and general illumination comprising:

a housing forming an interior cavity, the housing having an opening in a bottom portion thereof;

at least one light holder for holding at least one light source positioned within the interior cavity of the housing;

at least one diffuser plate positioned over the opening of the housing; and a plurality of louvers adjacent to the diffuser plate over the opening of the housing, wherein each of the plurality of louvers is positioned at an angle such that light produced by the light source is directed to a specific area, and wherein at least one louver spring is provided to hold the plurality of louvers in the proper position over the opening of the housing.

2. The lighting fixture of claim 1, wherein each of the plurality of louvers is positioned at the same angle.

3. The lighting fixture of claim 2, wherein each of the plurality of louvers is positioned at an angle of between about 40° to about 50°.

4. The lighting fixture of claim 3, wherein each of the plurality of louvers is positioned at an angle of about 45°.

5. The lighting fixture of claim 2, wherein each of the plurality of louvers is positioned at an angle of about 90°.

6. The lighting fixture of claim 1, wherein half of the plurality of louvers is positioned at a first angle and the remaining louvers are positioned at a second angle.

7. The lighting fixture of claim 1, wherein a ballast is connected to the at least one light holder to drive the at least one light source.

8. The lighting fixture of claim 7, wherein the ballast is one of a standard 40 to 55 watt ballast, a remotely adjustable and controllable digital ballast, a phase dim ballast, an adjustable analog ballast, and a switch-type non-dimming ballast.

9. The lighting fixture of claim 1, wherein the at least one diffuser plate is manufactured from a frosted acrylic material.

10. A method of providing lighting to a space, the method comprising:

providing a lighting fixture comprising:

a housing forming an interior cavity, the housing having an opening in a bottom portion thereof;

at least one light holder for holding at least one light source positioned within the interior cavity of the housing;

at least one diffuser plate positioned over the opening of the housing; and a plurality of louvers adjacent to the diffuser plate over the opening of the housing; and positioning each of the plurality of louvers at an angle such that light produced by the light source is directed to a specific area, wherein each of the plurality of louvers is positioned such that a beam spread provided by the lighting fixture extends substantially between 50% output points when viewed in a vertical direction.

11. The method of claim 10, wherein each of the plurality of louvers is positioned at the same angle.

12. The method of claim 11, wherein each of the plurality of louvers is positioned at an angle of between about 40° to about 50°.

13. The method of claim 12, wherein each of the plurality of louvers is positioned at an angle of about 45°.

14. A lighting fixture for use in video conferencing and general illumination comprising:

a housing forming an interior cavity, the housing having an opening in a bottom portion thereof;

at least one light source positioned within the interior cavity of the housing; and a plurality of louvers positioned over the opening of the housing, wherein each of the plurality of louvers is positioned such that a beam spread provided by the lighting fixture extends substantially between 50% output points when viewed in a vertical direction.

15. The lighting fixture of claim 14, wherein each of the plurality of louvers is positioned at the same angle.

16. The lighting fixture of claim 15, wherein each of the plurality of louvers is positioned at an angle of between about 40° to about 50°.

17. A lighting fixture for use in video conferencing and general illumination comprising:

a housing forming an interior cavity, the housing having an opening in a bottom portion thereof;

at least one light holder for holding at least one light source positioned within the interior cavity of the housing;

at least one diffuser plate positioned over the opening of the housing; and a plurality of louvers adjacent to the diffuser plate over the opening of the housing, wherein each of the plurality of louvers is positioned at an angle such that light produced by the light source is directed to a specific area, and wherein half of the plurality of louvers is positioned at a first angle and the remaining louvers are positioned at a second angle.

18. A method of providing lighting to a space, the method comprising:

providing a lighting fixture comprising:

a housing forming an interior cavity, the housing having an opening in a bottom portion thereof;

at least one light holder for holding at least one light source positioned within the interior cavity of the housing;

at least one diffuser plate positioned over the opening of the housing; and a plurality of louvers adjacent to the diffuser plate over the opening of the housing; and positioning each of the plurality of louvers at an angle such that light produced by the light source is directed to a specific area, wherein half of the plurality of louvers is positioned at a first angle and the remaining louvers are positioned at a second angle.

* * * * *